(12) United States Patent
Meehan et al.

(10) Patent No.: US 7,401,523 B2
(45) Date of Patent: Jul. 22, 2008

(54) CAPACITIVE SENSOR AND METHOD OF FABRICATING

(75) Inventors: Peter G. Meehan, Limerick (IE); Oliver Kierse, Co Clare (IE)

(73) Assignee: Analog Devices, Inc., Norwood, MA (US)

( * ) Notice: Subject to any disclaimer, the term of this patent is extended or adjusted under 35 U.S.C. 154(b) by 26 days.

(21) Appl. No.: 11/353,358

(22) Filed: Feb. 14, 2006

(65) Prior Publication Data

US 2006/0191350 A1     Aug. 31, 2006

Related U.S. Application Data

(60) Provisional application No. 60/656,238, filed on Feb. 25, 2005.

(51) Int. Cl.
*G01L 9/12* (2006.01)

(52) U.S. Cl. .......................... 73/718; 257/737

(58) Field of Classification Search .......... 73/718, 73/724; 257/737
See application file for complete search history.

(56) References Cited

U.S. PATENT DOCUMENTS

| | | | | |
|---|---|---|---|---|
| 5,933,317 | A * | 8/1999 | Moncrieff | 361/311 |
| 6,441,449 | B1 * | 8/2002 | Xu et al. | 257/414 |
| 2002/0025595 | A1 * | 2/2002 | Xu et al. | 438/48 |
| 2003/0095371 | A1 * | 5/2003 | Cheung | 361/326 |
| 2005/0229710 | A1 | 10/2005 | O'Dowd et al. | |
| 2006/0163726 | A1 | 7/2006 | Kierse et al. | |
| 2006/0191351 | A1 | 8/2006 | Meehan et al. | |

\* cited by examiner

*Primary Examiner*—Andre J. Allen
(74) *Attorney, Agent, or Firm*—Iandiorio, Teska & Coleman

(57) ABSTRACT

A capacitive sensor and a method of making it with a substrate having a diaphragm forming a first plate of a capacitor; a second fixed plate of the capacitor spaced from the diaphragm and defining a predetermined dielectric gap; a plurality of conductor elements interconnecting the substrate and fixed plate; and an edge lock supporting the fixed plate and the substrate relative to each other for maintaining the dimension of the defined gap independent of the conductor elements.

48 Claims, 7 Drawing Sheets

CAPACITIVE SENSOR AND METHOD OF FABRICATING

RELATED APPLICATIONS

This application claims the benefit of U.S. Provisional Application No. 60/656,238, filed Feb. 25, 2005, incorporated by reference herein.

FIELD OF THE INVENTION

This invention relates to an improved capacitive sensor and method for fabricating it and more particularly to such a capacitive sensor with a more reliable capacitive gap dimensions.

BACKGROUND OF THE INVENTION

In a capacitive sensor the dielectric gap between the fixed plate and the diaphragm must be strictly maintained if the sensing of the external pressure is to be accurate. Typically the fixed plate may be silicon with signal processing circuits on one side and conductor elements such as solder balls on the other. This fixed silicon plate may be flip chip bonded to a substrate, typically a ceramic material, which contains a diaphragm. External pressure changes on the diaphragm are reflected in changes in the dielectric gap dimension which translates into a change in capacitance. One problem with this construction is that the conductive elements, such a, the solder balls, which contain substantial lead, are susceptible to creep over time and temperature which will change the dimension of the dielectric gap. The stress and strain endured by the capacitive sensor during fabrication and in use can exacerbate this problem and sometimes cause failure of the solder balls resulting in an open circuit. Under filling, a technique used to seal and strengthen integrated circuits, is not applicable because it would fill and rigidify the dielectric gap and diaphragm destroying the fundamental capacitive function and because it uses an organic filler which cannot withstand the high temperatures encountered in fabrication and in some applications of the capacitive sensor, e.g., engine oil, tires. The organic fillers also tend to be more flexible and not suitable for rigidifying a structure.

BRIEF SUMMARY OF THE INVENTION

It is therefore an object of this invention to provide an improved capacitive sensor.

It is a further object of this invention to provide such an improved capacitive sensor which is more accurate and robust.

It is a further object of this invention to provide such an improved capacitive sensor which better maintains the dielectric gap dimension.

It is a further object of this invention to provide such an improved capacitive sensor which better maintains the dielectric gap dimension over time and temperature.

It is a further object of this invention to provide such an improved capacitive sensor which better maintains the dielectric gap dimension decoupled from and independent of the effects of creep on conductor elements, e.g. solder balls.

It is a further object of this invention to provide such an improved capacitive sensor which can endure adverse conditions in fabrication and use.

It is a further object of this invention to provide such an improved capacitive sensor which is less vulnerable to mechanical stress and strain due to e.g. heat, gravity, external forces.

It is a further object of this invention to provide such an improved capacitive sensor which adds mechanical strength and supports the conductor elements and makes them less likely to fail electrically and mechanically.

The invention results from the realization that an improved capacitive sensor with a more reliable dielectric gap dimension can be achieved by an edge lock supporting, relative to each other, the fixed plate and the substrate containing the diaphragm forming the second plate of the capacitor for maintaining the dimension of the dielectric gap between the plates independent of the conductor elements interconnecting the plates.

The subject invention, however, in other embodiments, need not achieve all these objectives and the claims hereof should not be limited to structures or methods capable of achieving these objectives.

This invention features a capacitive sensor including a substrate having a diaphragm forming a first plate of the capacitor and a second fixed plate of the capacitor spaced from the diaphragm and defining a predetermined dielectric gap. There is a plurality of conductor elements interconnecting the substrate and fixed plate and an edge lock supporting the fixed plate and the substrate relative to each other for maintaining the dimension of the defined gap independent of the conductor elements.

In a preferred embodiment the substrate may include ceramic material; the fixed plate may include signal processing circuits on the face opposite the diaphragm. The fixed plate may include silicon. It may include a ceramic material. It may include a conductor surface facing the diaphragm. The conductor elements may include solder balls. One of the fixed plate and substrate may include wells for receiving the conductor elements for limiting the extent of the edge lock and/or may include wells for receiving the conductor elements for limiting the extent of the edge lock. One of the fixed plate and substrate may include walls between the conductor elements and the diaphragm for limiting the extent of the edge lock. The substrate may include walls between the conductor elements and the diaphragm for limiting the extent of the edge lock. The conductor elements may engage the substrate outside the area of the diaphragm or may engage the substrate inside the area of the diaphragm. The edge lock may include a frit material. It may be a glass frit material. At least the smaller of the plates may be generally rectangular and the edge lock may be disposed at the corners of the smaller of the plates. The edge lock may be disposed at the periphery of the smaller of the plates. The edge lock may be disposed at spaced areas along the periphery of the smaller of the plates. At least the smaller of the plates may be generally rectangular or square and the edge lock may be disposed at the corners of the fixed plate or may be disposed at the periphery of the fixed plate or at spaced areas along the periphery of the fixed plate. The edge lock may extend inwardly to the conductor elements. The edge lock may extend to at least partially envelop the proximate conductor elements. The edge lock may extend between the plates between the diaphragm and periphery of the smaller of the plates.

This invention also features a method of fabricating a capacitor sensor including providing a substrate having a diaphragm forming a first plate of a capacitor and providing a second fixed plate of the capacitor spaced from the diaphragm and defining a predetermined dielectric gap. The substrate and fixed plate are interconnected with a plurality of conductor elements and the fixed plate and the substrate are supported relative to each other with an edge lock which maintains the dimension of the defined gap independent of the conductor elements.

In a preferred embodiment the substrate may include a ceramic material. The fixed plate may include signal processing circuits on the face opposite the diaphragm. The fixed plate may include silicon. It may include a ceramic material. It may include a conductor on its surface facing the diaphragm. At least one of the fixed plate and substrate may include wells for receiving the conductor elements for limiting the extent of the edge lock. Wells may be formed in the substrate for receiving the conductor elements for limiting the extent of the edge lock. One of the fixed plate and substrate may include walls between the conductor elements and the display for limiting the extent of the edge lock. The walls may be formed in the substrate between the conductor elements and the diaphragm for limiting the extent of the edge lock. The conductor elements may be engaged with the substrate outside the area of the diaphragm. The conductor elements may be engaged with the substrate inside the area of the diaphragm. The edge lock may include a frit material. It may be glass frit material. At least the smaller of the plates may be generally rectangular or square and the edge lock may be disposed at the corners of the smaller of the plates. The edge lock may be disposed at the periphery of the smaller of the plates. It may be at spaced areas along the periphery of the smaller of the plates. The edge lock may be disposed at the corners of the fixed plate or along the periphery of the plate or spaced along the periphery of the fixed plate. The edge lock may extend inwardly to the conductor elements. The edge lock may extend to at least partially envelop the proximate conductor elements. The edge lock may extend between the plates between the diaphragm and periphery of the smaller of the plates.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
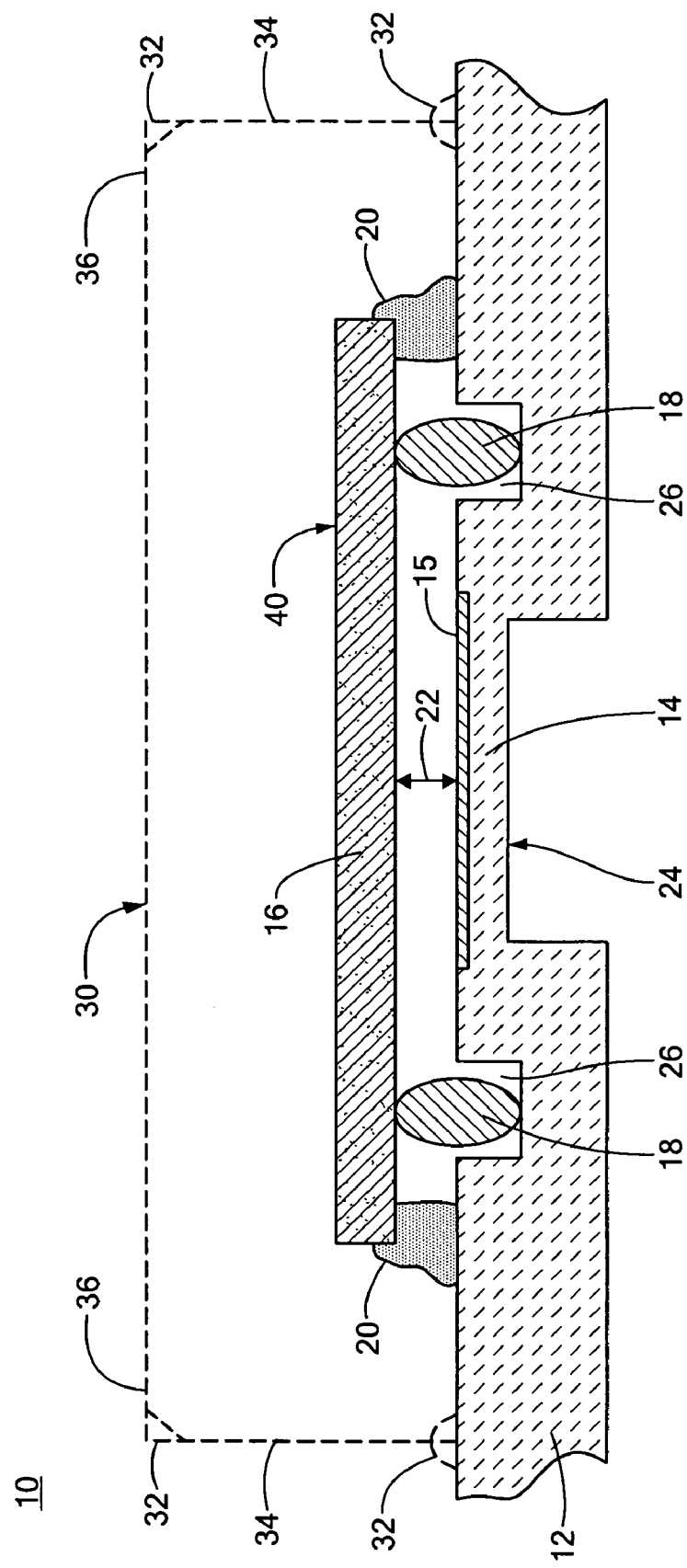
FIG. 1 is a side sectional schematic view of one embodiment of an improved capacitive sensor according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a capacitive sensor 10 according to this invention including a substrate 12 having formed in it a diaphragm 14 which forms one plate of a capacitor. The other plate of the capacitor is formed by a second, fixed plate 16 which is interconnected with substrate 12 by conductor elements, solder balls 18. An edge lock 20 locks together fixed plate 16 and substrate 12 so that the dielectric gap 22 between them remains fixed independent of creep or other problems that may afflict solder balls 18. Only changes in pressure 24 on the outside of diaphragm 14 will change the dimension of dielectric gap 22 and thus change the capacitance of capacitor 10. This change in capacitance is then calibrated to the applied pressure in ways well known to those skilled in the art. A metal plate or metal infused into the ceramic may be provided at 15 on substrate 12.

By decoupling the primary support between fixed plate 16 and substrate 12 the creep with time or temperature or other problems besetting solder balls 18 will not affect the dimension of dielectric gap 22. Also with edge lock 20 supporting the substrate 12 in fixed plate 16 the solder balls 18 are relatively free from stress and strain which could cause them to fail mechanically and electrically. The edge lock may be a frit, such as a glass frit sold by Ferroelectronics Material Systems, Inc. of Vista, Calif. under the name of Seal Glass Paste DL11036 Model FX-11-036. While this has been used in embodiments to date any other suitable bonding material, e.g., epoxy or organic or inorganic adhesives for example Ablestik 660 available from Ablestick Laboratories, Rancho Dominguez, Calif. may be used. Substrate 12 may be any suitable ceramic, such as alumina, $Al_2O_3$. Fixed plate 16 may be silicon in which case it may contain on or incorporated into its top surface opposite diaphragm 14 a signal conditioning circuit 40. Alternatively, fixed plate 16 may be a ceramic and could be the same material as substrate 12 which would have the added benefit of that both plates would have the same coefficient of thermal expansion.

Diaphragm 14 may be made integral and co-fired with substrate 12. If fixed plate 16 it made of a ceramic it may contain a metalized surface on the side facing diaphragm 14. Sensor 10 may be made by the flip chip process whereby fixed plate 16 containing, for example, a signal processing circuit 40 on its upper face and on its lower face solder balls 18. The chip or fixed plate 16 is then flipped and solder balls 18 are located in wells 26 in substrate 12. After the flip chip assembly is completed a cap 30 may be placed over the structure and bonded to substrate 12 by a bonding material such as glass 32. In some assemblies the walls 34 and top 36 are separate pieces and they also are joined by some bonding material such as glass 32. This attachment and the co-firing of the glass may require very high temperatures, for example, 320 degrees centigrade. This prevents the use of organic bonding materials in place of a frit for the edge lock 20. In addition, capacitive sensors are used in a number of applications where the conditions are extreme, such as, in engine oil and in tires, for example.

Figure 2:
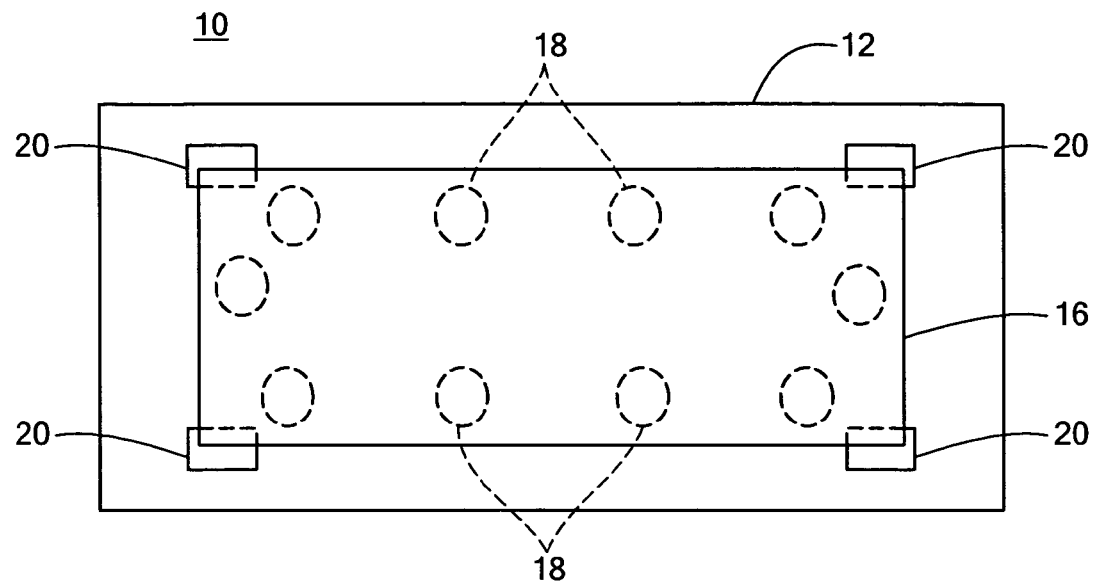
FIG. 2 is a top plan schematic view of the sensor of FIG. 1 showing one pattern of edge lock.
Figure 3:
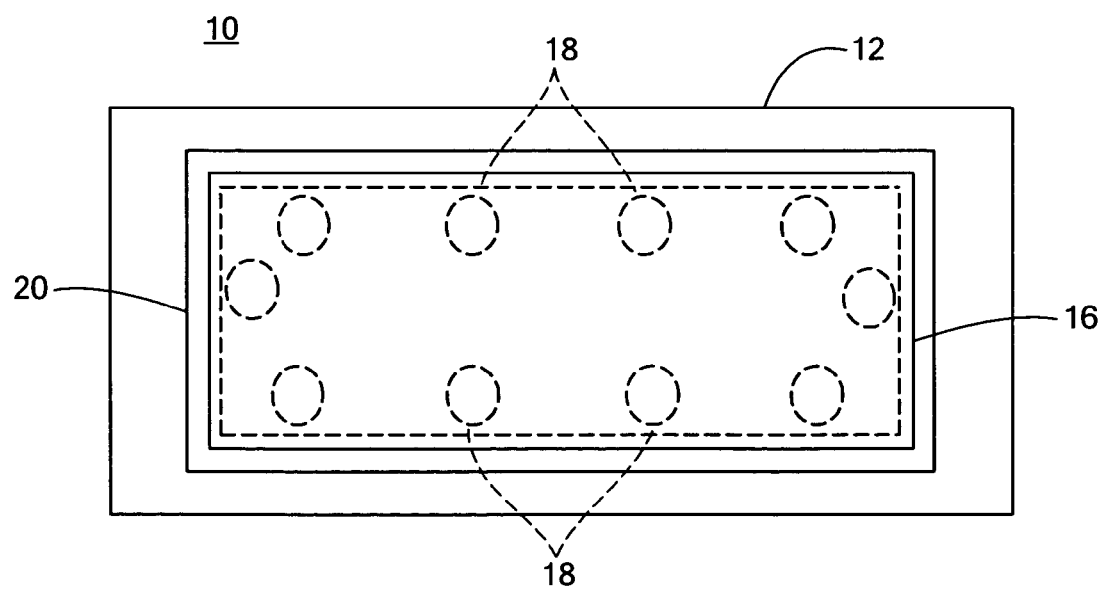
FIG. 3 is a top plan schematic view of the sensor of FIG. 1 showing a second pattern of edge lock.
Figure 4:
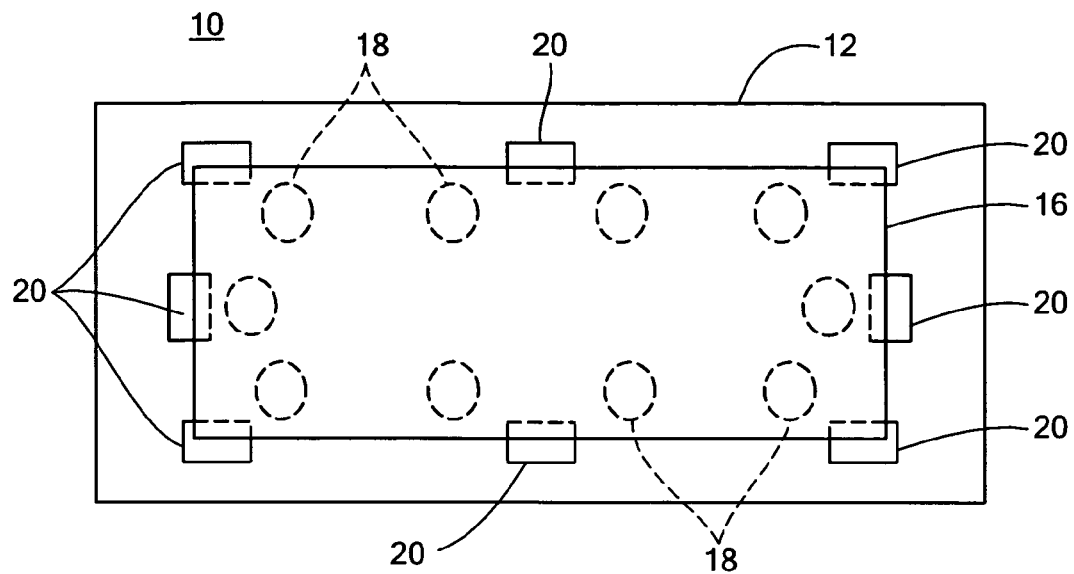
FIG. 4 is a top plan schematic view of the sensor of FIG. 1 showing a third pattern of edge lock.
Figure 5:
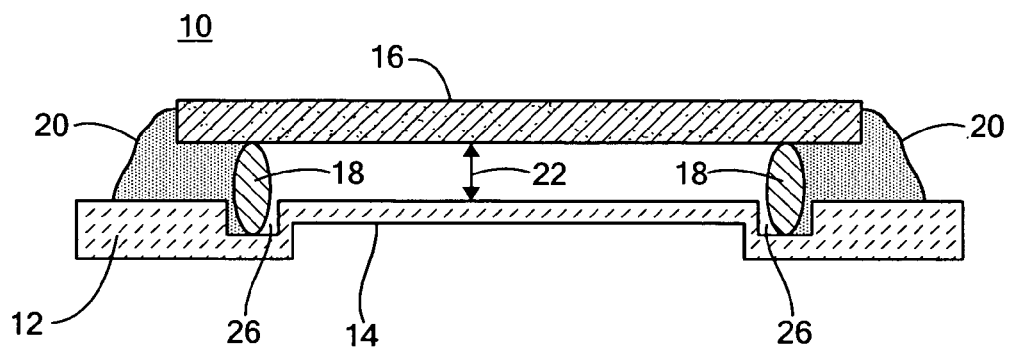
FIG. 5 is a view similar to FIG. 1 with the edge lock at least partially enveloping the conductor elements.
Figure 6:
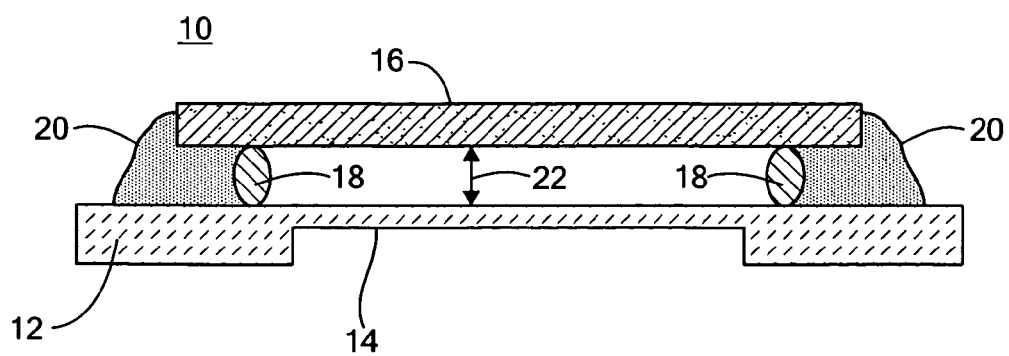
FIG. 6 is a view similar to FIG. 5 without the wells.
Figure 7:
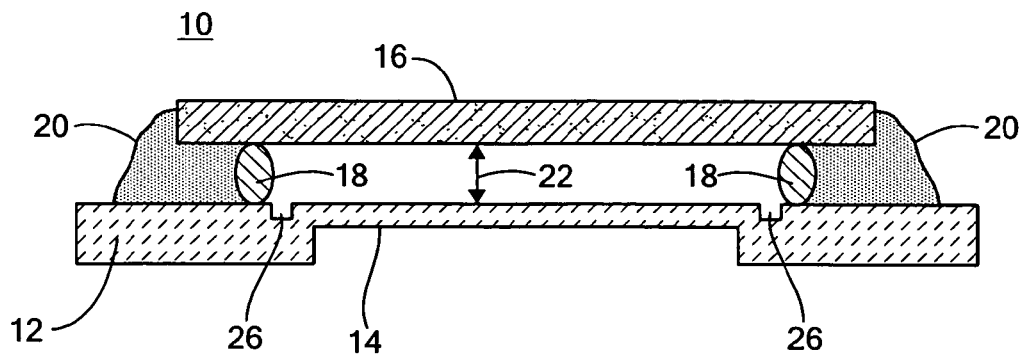
FIG. 7 is a view similar to FIG. 6 with a moat or wells to reduce wicking.
Figure 8:
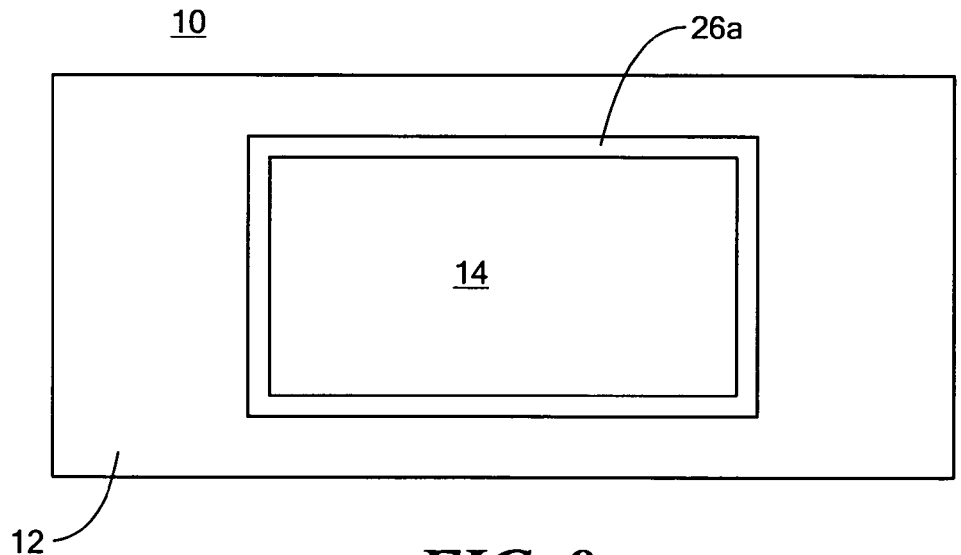
FIG. 8 is a top plan schematic view of the substrate of FIG. 7.
Figure 9:
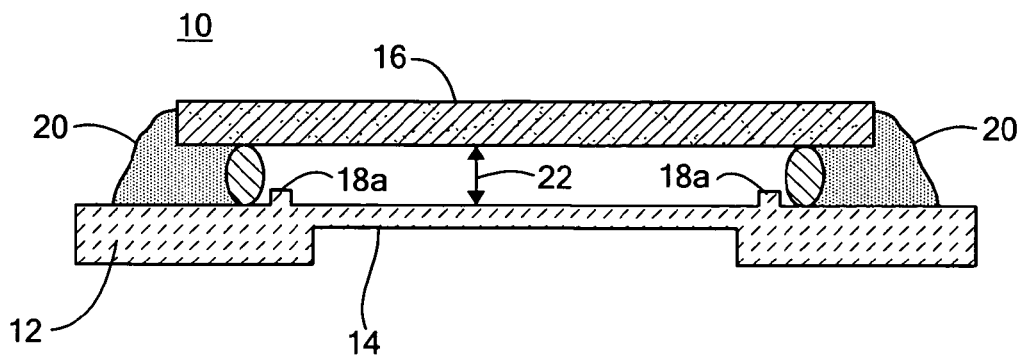
FIG. 9 is a view similar to FIG. 7 with a wall or walls replacing the moat or wells.

Edge lock 20 may be used in various patterns or configurations. For example, FIG. 2, where substrate 12 is larger that fixed plate 16 and both are rectangular or square in shape, edge lock 20 may be positioned at the four corners. Or as shown in FIG. 3, edge lock 20 could be continuous around the edge of fixed plate 16. Or edge locks 20 may be spaced about the periphery, FIG. 4. The edge lock or frit may partially or completely envelop solder balls 18, FIG. 5, and may actually fill wells 26. Although thus far solder balls 18 have been shown disposed in wells, this is not a necessary limitation of the invention for there may be no wells, FIG. 6, and they may engage directly with the front facing surfaces of substrate 12 and fixed plate 16. Contrastingly there may be wells 26, FIG. 7, but solder balls 18 need not be located in them. Alternatively, the wells 26 may be a continuous moat 26a, FIG. 8. Alternatively, there may be provided walls 18a, FIG. 9 instead of wells. Whether there be wells or walls both function to the same purpose, they prevent under flowing of the edge lock flit, for example, where it would interfere with gap 22 and the free motion of diaphragm 14. The wells 26, FIG. 7, and walls 18a, FIG. 9, also prevent wicking across the diaphragm which would undesirably stiffen it. The surface tension of the edge lock material e.g., frit, prevents the wicking on one surface from extending significantly farther than on the other surface. Although the wells and walls are shown on substrate 12, this is not a necessary limitation of the invention as they may be on fixed plate 16 as well.

Figure 10:
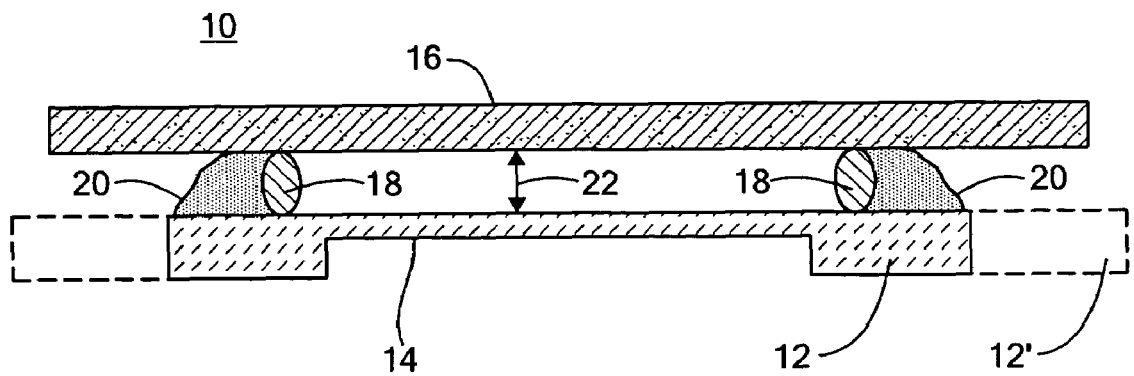
FIG. 10 is a view similar to FIG. 6 illustrating location of the edge lock at the edge of the smaller of the plates and generally between the diaphragm and the periphery of the smaller plate.

Although thus far the fixed plate 16 has been shown as smaller than the substrate 12 this is not a necessary limitation of the invention for as shown in FIG. 10 substrate 12 may be smaller than fixed plate 16 in which case frit 20 is more correctly characterized as being at the edge or periphery of the smaller one of the two, in this case, substrate 12. Actually edge lock 20 need not be at the edge of either fixed plated 16 or substrate 12. For example, with substrate 12' shown in its typical larger relationship, edge lock 20 is then at the edge of neither fixed plate 16 or substrate 12. Regardless of the relative size of the plates the edge lock is always between the plates and between the diaphragm and the periphery of the smaller of the plates. It need not necessarily be at the periphery of the smaller of the plates but just has to be inside it, a physical given.

Figure 11:
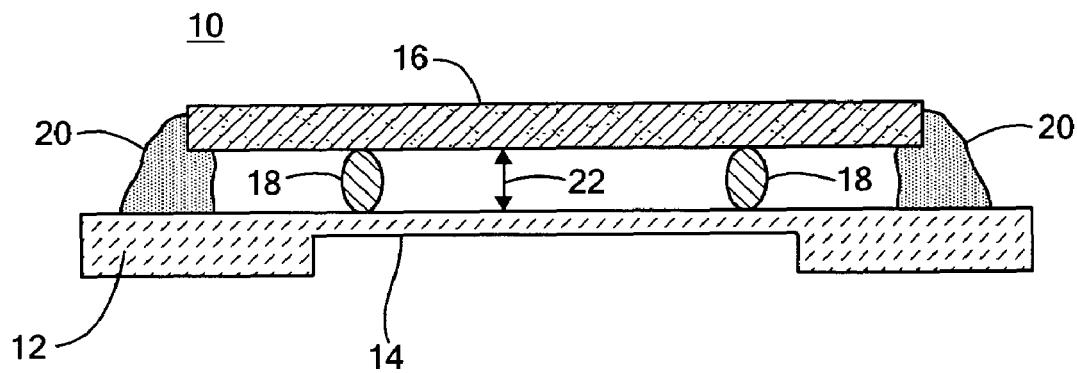
FIG. 11 is a view similar to FIG. 6 with the conductor elements on the diaphragm.
Figure 12:
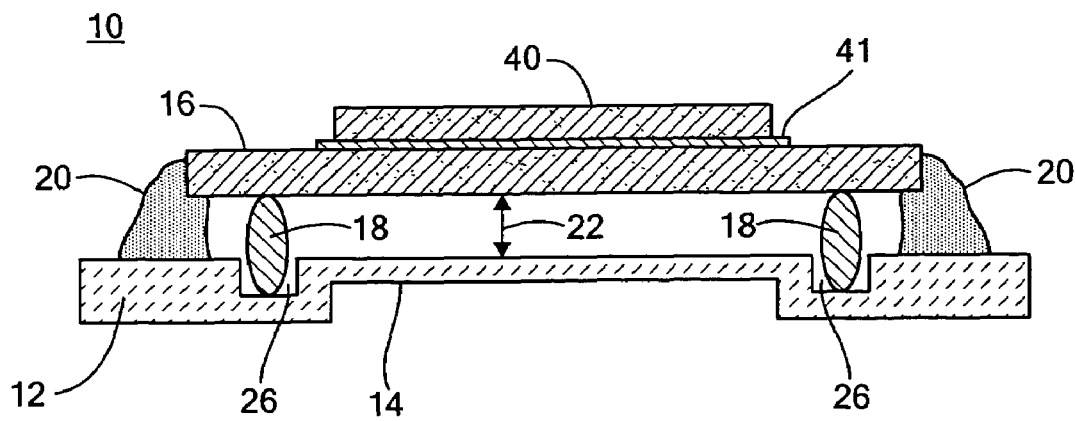
FIG. 12 is a view similar to FIG. 1 with a signal processing circuit on the fixed plate.
Figure 13:
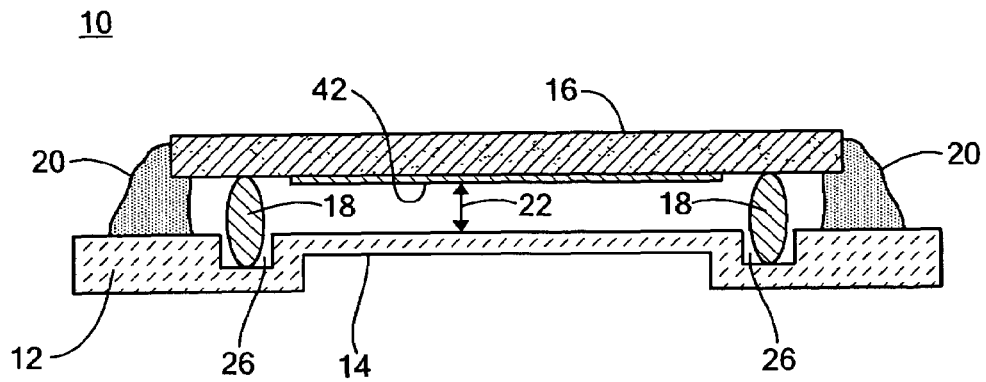
FIG. 13 is a view similar to FIG. 12 with a metalized surface on the face of the fixed plate facing the diaphragm.

Thus far the conductor elements, solder balls 18, have been shown engaging with substrate 12 outside of the area of diaphragm 14, this too is not a necessary limitation of the invention as shown in FIG. 11 where solder balls 18 are within the periphery of diaphragm 14. Fixed plate 16, FIG. 12, may contain the signal processing circuit 40, on die attach layer 41, on its surface opposite gap 22 with fixed plate 16 being made of alumina $Al_2O_3$ or silicon. Or with fixed plate 16, FIG. 13, being a ceramic, or alumina, or silica, it may contain a metalized surface 42 on its underside facing diaphragm 14 where metalized surface 42 forms the second plate of the capacitor.

Figure 14:
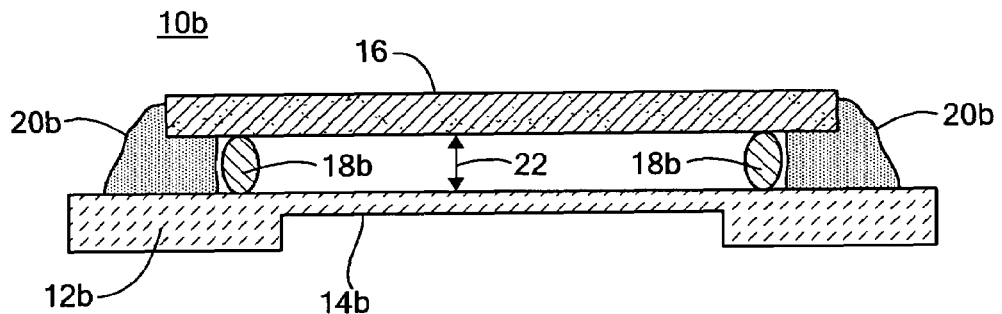
FIG. 14 is a view similar to FIG. 6 with the shapes of the plate and substrate being generally elliptical.
Figure 15:
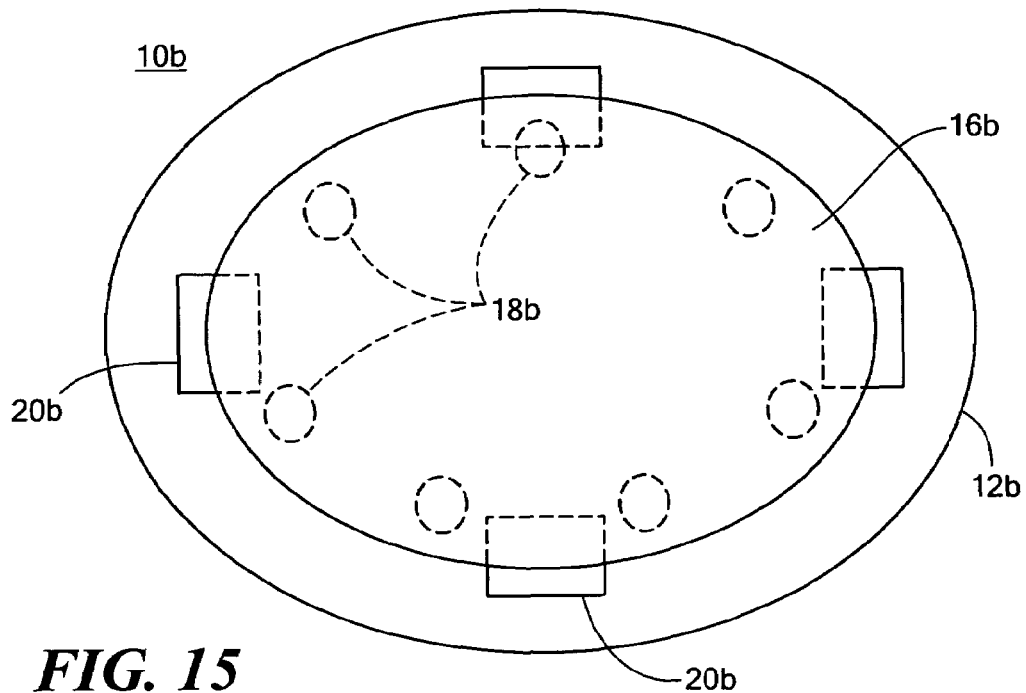
FIG. 15 is a plan sectional schematic view of the capacitive sensor of FIG. 14.

Thus far the capacitive sensor has been depicted as generally rectangular, this, too, is not a limitation of the invention. It maybe any suitable shape regular or irregular, e.g., elliptical, rectangular, square, or round as represented by plate 16b and substrate 12b, FIGS. 14 and 15.

Figure 16:
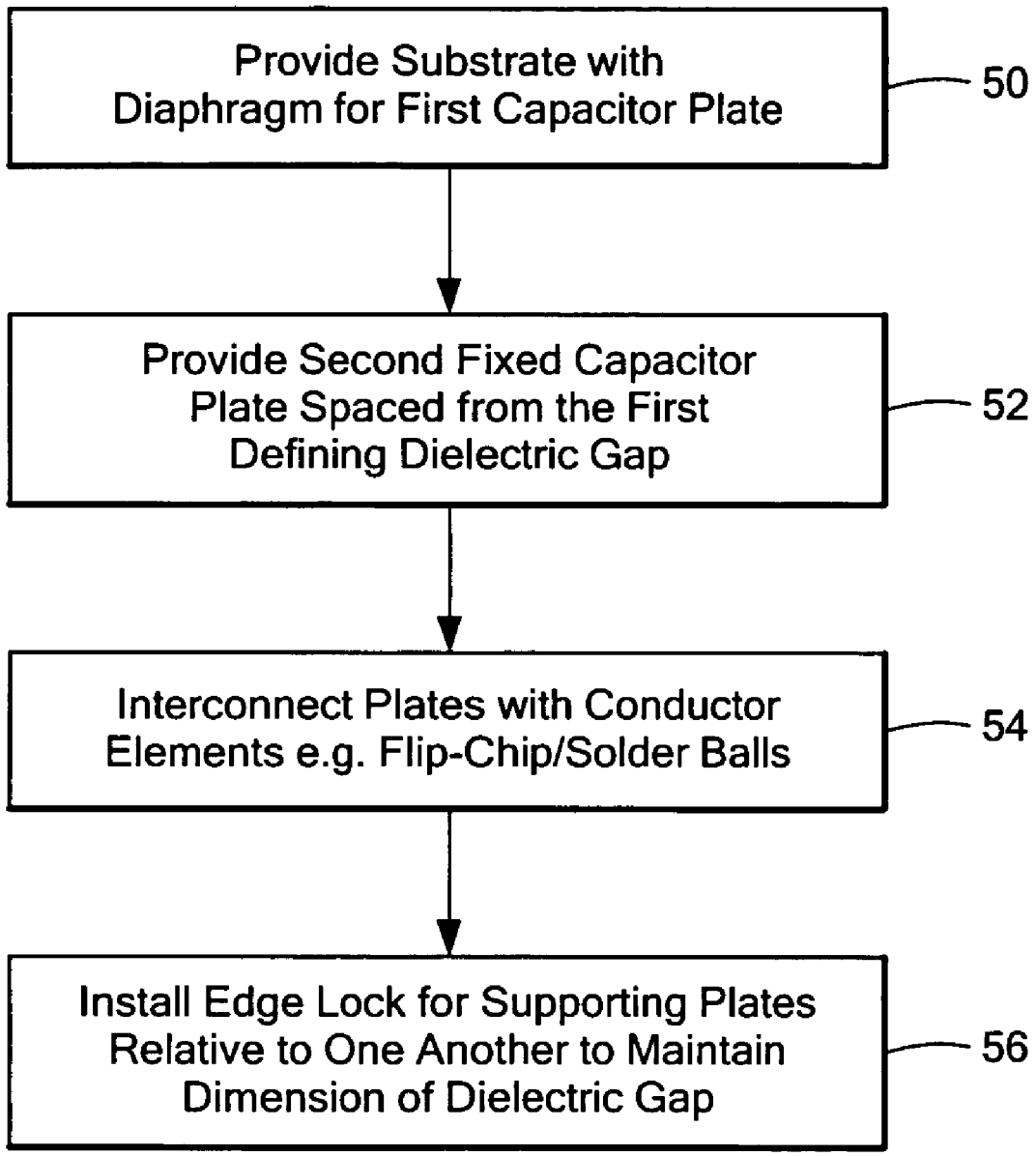
FIG. 16 is a block diagram of the method according to this invention.

The method of making a capacitive sensor according to this invention is shown in FIG. 16. Initially a substrate is provided with a diaphragm which forms the first capacitor plate 50. A second fixed capacitor plate is supplied spaced from the first and defining a dielectric gap 52. The plates are interconnected 54 with conductor elements such as flip chip solder balls. An edge lock is installed 56 for supporting plates relative to one another to maintain the dimension of the dielectric gap. There may be provided wells, walls or moats in order to arrest the placement of the edge lock and prevent it from interfering with the operation of the diaphragm. The conductor elements may be in the wells or not and within or without the periphery of the diaphragm. Various materials, such as, ceramic, alumina or silicon may be used for the fixed plate and the substrate which forms the first plate in diaphragm 14 may be a ceramic. The fixed plate may carry a metalized surface on its face toward diaphragm 14. On its other face it may carry a signal processing circuit for the capacitive sensor.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A capacitive sensor comprising:
   a substrate having a diaphragm forming a first plate of a capacitor;
   a second fixed plate of the capacitor spaced from said diaphragm and defining a predetermined dielectric gap;
   a plurality of conductor elements interconnecting said substrate and fixed plate; and
   an edge lock supporting said fixed plate and said substrate relative to each other for maintaining the dimension of said defined gap independent of said conductor elements.

2. The capacitive sensor of claim 1 in which said substrate includes a ceramic material.

3. The capacitive sensor of claim 1 in which said fixed plate includes signal processing circuits on the face opposite said diaphragm.

4. The capacitive sensor of claim 1 in which said fixed plate includes silicon.

5. The capacitive sensor of claim 1 in which said fixed plate includes a ceramic material.

6. The capacitive sensor of claim 5 in which said fixed plate includes a conductor surface facing said diaphragm.

7. The capacitive sensor of claim 1 in which said conductor elements include solder balls.

8. The capacitive sensor of claim 1 in which said one of said fixed plate and substrate includes wells for receiving said conductor elements for limiting the extent of said edge lock.

9. A capacitive sensor of claim 1 in which said substrate includes wells for receiving said conductor elements for limiting the extent of said edge lock.

10. The capacitive sensor of claim 1 in which said one of said fixed plate and substrate includes walls between said conductor elements and said diaphragm for limiting the extent of said edge lock.

11. A capacitive sensor of claim 1 in which said substrate includes walls between said conductor elements and said diaphragm for limiting the extent of said edge lock.

12. The capacitive sensor of claim 1 in which said conductor elements engage said substrate outside the area of said diaphragm.

13. The capacitive sensor of claim 1 in which said conductor elements engage said substrate inside the area of said diaphragm.

14. The capacitive sensor of claim 1 in which said edge lock includes a frit material.

15. The capacitive sensor of claim 1 in which said edge lock includes a glass frit material.

16. The capacitive sensor of claim 1 in which at least the smaller of said plates is generally rectangular or square and said edge lock is disposed at the corners of the smaller of said plates.

17. The capacitive sensor of claim 1 in which said edge lock is disposed at the periphery of the smaller of said plates.

18. The capacitive sensor of claim 17 in which said edge lock is disposed at spaced areas along the periphery of the smaller of said plates.

19. The capacitive sensor of claim 1 in which at least the smaller of said plates is generally rectangular or square said edge lock is disposed at the corners of the said fixed plate.

20. The capacitive sensor of claim 1 in which said edge lock is disposed at the periphery of the said fixed plate.

21. The capacitive sensor of claim 17 in which said edge lock is disposed at spaced areas along the periphery of said fixed plate.

22. The capacitive sensor of claim 1 in which said edge lock extends inwardly to said conductor elements.

23. The capacitive sensor of claim 1 in which said edge lock extends to at least partially envelop the proximate said conductor elements.

24. The capacitive sensor of claim 1 in which said edge lock extends between said plates between the diaphragm and periphery of the smaller of the plates.

25. A method of fabricating a capacitive sensor comprising:
   providing a substrate having a diaphragm forming a first plate of a capacitor;
   providing a second fixed plate of the capacitor spaced from said diaphragm and defining a predetermined dielectric gap;
   interconnecting said substrate and fixed plate with a plurality of conductor elements; and
   supporting said fixed plate and said substrate relative to each other with an edge lock for maintaining the dimension of said defined gap independent of said conductor elements.

26. The method of fabricating a capacitive sensor of claim 25 in which said substrate includes a ceramic material.

27. The method of fabricating a capacitive sensor of claim 25 in which said fixed plate includes signal processing circuits on the face opposite said diaphragm.

28. The method of fabricating a capacitive sensor of claim 25 in which said fixed plate includes silicon.

29. The method of fabricating a capacitive sensor of claim 25 in which said fixed plate includes a ceramic material.

30. The method of fabricating a capacitive sensor of claim 29 in which said fixed plate includes a conductor surface facing said diaphragm.

31. The method of fabricating a capacitive sensor of claim 25 in which said conductor elements include solder balls.

32. The method of fabricating a capacitive sensor of claim 25 in which one of said fixed plate and substrate includes wells for receiving said conductor elements for limiting the extent of said edge lock.

33. The method of fabricating a capacitive sensor of claim 25 further including forming wells in said substrate for receiving said conductor elements for limiting the extent of said edge lock.

34. The method of fabricating a capacitive sensor of claim 25 in which said one of said fixed plate and substrate includes walls between said conductor elements and said diaphragm for limiting the extent of said edge lock.

35. The method of fabricating a capacitive sensor of claim 25 further including forming in said substrate walls between said conductor elements and said diaphragm for limiting the extent of said edge lock.

36. The method of fabricating a capacitive sensor of claim 25 in which said conductor elements engage said substrate outside the area of said diaphragm.

37. The method of fabricating a capacitive sensor of claim 25 in which said conductor elements engage said substrate inside the area of said diaphragm.

38. The method of fabricating a capacitive sensor of claim 25 in which said edge lock includes a frit material.

39. The method of fabricating a capacitive sensor of claim 25 in which said edge lock includes a glass frit material.

40. The method of fabricating a capacitive sensor of claim 25 in which at least the smaller of said plates is generally rectangular and said edge lock is disposed at the corners of the smaller of said plates.

41. The method of fabricating a capacitive sensor of claim 25 in which said edge lock is disposed at the periphery of the smaller of said plates.

42. The method of fabricating a capacitive sensor of claim 41 in which said edge lock is disposed at spaced areas along the periphery of the smaller of said plates.

43. The method of fabricating a capacitive sensor of claim 25 in which at least the smaller of said plates is generally rectangular or square said edge lock is disposed at the corners of the said fixed plate.

44. The method of fabricating a capacitive sensor of claim 25 in which said edge lock is disposed at the periphery of the said fixed plate.

45. The method of fabricating a capacitive sensor of claim 25 in which said edge lock is disposed at spaced areas along the periphery of said fixed plate.

46. The method of fabricating a capacitive sensor of claim 25 in which said edge lock extends inwardly to said conductor elements.

47. The method of fabricating a capacitive sensor of claim 25 in which said edge lock extends to at least partially envelop the proximate said conductor elements.

48. The method of fabricating a capacitive sensor of claim 25 in which said edge lock extends between said plates between the diaphragm and periphery of the smaller of the plates.

* * * * *